United States Patent
Kobayashi

(10) Patent No.: US 8,332,094 B2
(45) Date of Patent: Dec. 11, 2012

(54) VEHICULAR PASSENGER DETECTION SYSTEM

(75) Inventor: Masatoshi Kobayashi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 417 days.

(21) Appl. No.: 12/314,085

(22) Filed: Dec. 3, 2008

(65) Prior Publication Data

US 2009/0150030 A1    Jun. 11, 2009

(30) Foreign Application Priority Data

Dec. 7, 2007   (JP) ................... 2007-316484

(51) Int. Cl.
- G01M 17/00  (2006.01)
- G06F 7/00   (2006.01)
- G06F 19/00  (2011.01)
- G06F 11/30  (2006.01)
- G07C 5/00   (2006.01)

(52) U.S. Cl. ............. 701/31.6; 701/30.8; 701/33.4; 280/735

(58) Field of Classification Search ............ 701/29, 701/34, 45, 29.1, 29.4, 29.9, 30.8, 31.6, 31.7, 701/33.4; 280/727, 728.1, 734, 735
See application file for complete search history.

(56) References Cited

U.S. PATENT DOCUMENTS

| | | | |
|---|---|---|---|
| 5,482,314 A * | 1/1996 | Corrado et al. | 280/735 |
| 6,727,823 B2 | 4/2004 | Ando et al. | |
| 7,756,616 B2 * | 7/2010 | Helm | 701/29 |
| 7,801,652 B2 * | 9/2010 | Regnard de Lagny et al. | 701/35 |
| 2008/0004764 A1 * | 1/2008 | Chinnadurai et al. | 701/29 |

FOREIGN PATENT DOCUMENTS

| | | |
|---|---|---|
| JP | 2002-341052 | 11/2002 |
| JP | 2003-327072 | 11/2003 |
| JP | 2006-178528 | 7/2006 |

OTHER PUBLICATIONS

Japanese Office Action dated Oct. 9, 2012 in Japanese Patent Application No. 2007-316484.

* cited by examiner

*Primary Examiner* — Hussein Elchanti
*Assistant Examiner* — Rami Khatib
(74) *Attorney, Agent, or Firm* — Wenderoth, Lind & Ponack, L.L.P.

(57) ABSTRACT

A vehicular passenger detection system includes a load detection device configured to detect a load that acts upon a seat that is installed upon a vehicle, a passenger seating detection device configured to determine whether or not a passenger is seated upon the seat, in accordance with a result of a detection of the load detection device, and a fault recording device configured to record an information of a fault that has occurred upon either the load detection device or the passenger seating detection device. The fault recording device includes a fault determination device configured to determine whether or not the information of the fault is information of a fault for which a repair is required.

3 Claims, 4 Drawing Sheets

FIG.4A

Fault Recording Unit Table

| Fault Code Number | Information of Fault |
|---|---|
| 1 | — |
| 2 | — |
| 3 | — |
| 4 | — |
| 5 | — |
| 6 | — |

Baseline Value Compensation Recording Unit Table

| Information of Baseline Value Compensation |
|---|
| — |

FIG.4B

Fault Recording Unit Table

| Fault Code Number | Information of Fault |
|---|---|
| 1 | ECU Fault |
| 2 | — |
| 3 | — |
| 4 | — |
| 5 | — |
| 6 | — |

Baseline Value Compensation Recording Unit Table

| Information of Baseline Value Compensation |
|---|
| — |

FIG.4C

Fault Recording Unit Table

| Fault Code Number | Information of Fault |
|---|---|
| 1 | ECU Fault |
| 2 | — |
| 3 | — |
| 4 | — |
| 5 | — |
| 6 | — |

Baseline Value Compensation Recording Unit Table

| Information of Baseline Value Compensation |
|---|
| 1 |

FIG.4D

Fault Recording Unit Table

| Fault Code Number | Information of Fault |
|---|---|
| 1 | ECU Fault |
| 2 | Sensor Fault |
| 3 | ECU Fault |
| 4 | — |
| 5 | — |
| 6 | — |

Baseline Value Compensation Recording Unit Table

| Information of Baseline Value Compensation |
|---|
| 1 |

VEHICULAR PASSENGER DETECTION SYSTEM

CROSS-REFERENCE TO THE RELATED APPLICATION

The present application is based on and claims priority from Japanese Patent Application Number 2007-316484, filed on Dec. 7, 2007, the disclosure of which is hereby incorporated by reference herein in its entirety.

BACKGROUND OF THE INVENTION

1. Field of the Invention

The present invention relates to a vehicular passenger detection system, comprising a load detection unit, a passenger seating detection unit, and a fault detection unit.

2. Description of the Related Art

Conventionally, a passenger detection system is known that detects a load that acts upon a seat by way of a load detection device, and determines, by way of a determination device, and in accordance with a detection value that is detected by the load detection device, whether or not a passenger is seated in the seat thereof; refer, as an instance thereof, to Japanese Patent Application Publication No. 2002-341052.

When a fault arises with the passenger detection system, such as with the load detection device or the determination device thereof, an information of the fault, such as a location of the fault and a description of the fault, is recorded upon a fault recording device thereof, and a history of the fault is thereby retained.

The fault recording device according to the passenger detection system described herein, however, simply records the information of the fault in order of occurrence on a per fault occurrence basis thereof, without distinguishing between an information of a fault that has occurred prior to the fault being repaired and an information of a fault that recurs subsequent to the fault having been repaired. As a consequence thereof, a problem arises wherein it is not possible to determine, simply by reading out the information of the fault from the fault recording device, whether the information of the fault thereof relates to a fault whereupon a repair is necessary, or whether the information of the fault thereof relates to a fault whereupon the repair has been completed, and thus, a repair is not necessary thereupon.

SUMMARY OF THE INVENTION

An object of the present invention is to provide a vehicular passenger detection system that is capable of determining whether or not the information of the fault thereof is an information of a fault that relates to fault whereupon a repair is required.

To accomplish the above object, a vehicular passenger detection system according to an embodiment of the present invention includes a load detection device configured to detect a load that acts upon a seat that is installed upon a vehicle, a passenger seating detection device configured to determine whether or not a passenger is seated upon the seat, in accordance with a result of a detection of the load detection device, and a fault recording device configured to record an information of a fault that has occurred upon either the load detection device or the passenger seating detection device.

The fault recording device includes a fault determination device configured to determine whether or not the information of the fault is information of a fault whereupon a repair is required.

BRIEF DESCRIPTION OF THE DRAWINGS

FIG. 4 is a diagram that depicts an instance of a recording method of a fault recording with respect to the fault recording process that is depicted in FIG. 3, wherein FIG. 4A depicts a state thereof prior to a finding and a diagnosis of a fault, FIG. 4B depicts a state wherein the fault has been found and diagnosed, FIG. 4C depicts a state wherein a baseline value compensation of a maintenance or repair has been performed, and FIG. 4D depicts a state wherein a fault has once again been found and diagnosed.

DETAILED DESCRIPTION OF THE PREFERRED EMBODIMENTS

Preferred embodiments of the present invention will be explained in detail hereinafter with reference to the accompanying drawings.

Figure 1:
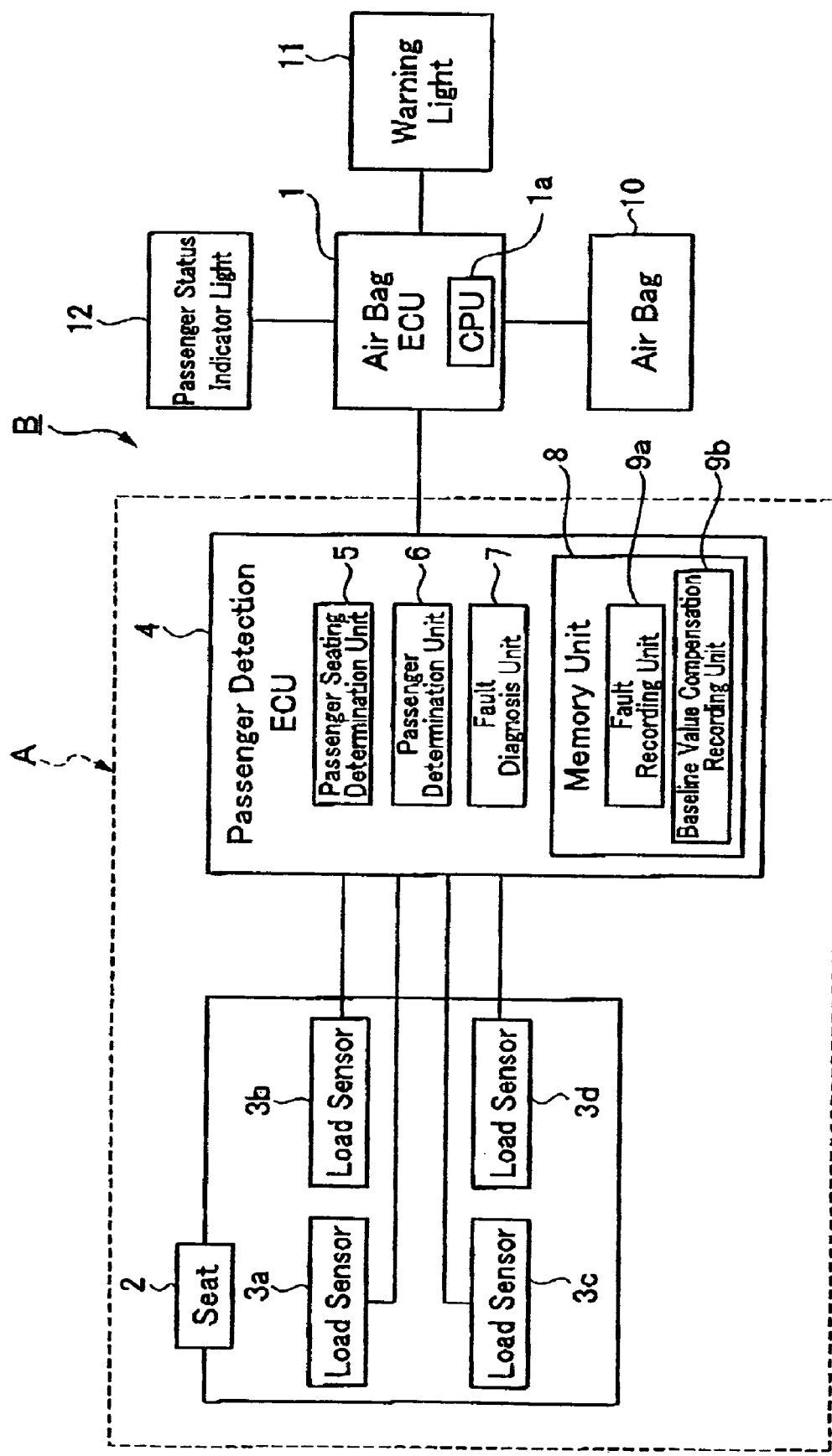
FIG. 1 is a block diagram that depicts an air bag system that employs a vehicular passenger detection system according to an embodiment of the present invention.

FIG. 1 illustrates an embodiment according to the present invention wherein a vehicular passenger detection system A is embedded within an air bag system B that is installed into a vehicle.

The vehicular passenger detection system A includes either a plurality of load sensors or a plurality of load detection devices 3a to 3d that are attached to a seat 2 which is installed in a vehicle, and a passenger detection electronic control unit (ECU) 4, which is connected to an air bag electronic control unit (air bag ECU) 1 of the air bag system B, such as is depicted in FIG. 1. The air bag electronic control unit (air bag ECU) 1 is connected to an air bag 10, a warning light 11, and a passenger status display light 12.

The air bag ECU 1 contains a CPU 1a, which performs a deployment control of the air bag 10 in accordance with information of a passenger that is obtained from the vehicular passenger detection system A. According to the embodiment, the air bag electronic control unit (air bag ECU) 1 is configured to perform a deployment control of the air bag 10, such as not deploying the air bag 10 when no passenger is present, fully deploying the air bag 10 when an adult passenger is aboard the vehicle, and not deploying the air bag 10 when a child passenger is aboard the vehicle in a child safety seat.

In addition, when the deployment control of the air bag 10 is performed thereupon, the air bag ECU 1 is configured to input a deployment signal, which denotes that the air bag 10 has been deployed, to the passenger detection ECU 4 (to be described hereinafter) of the vehicular passenger detection system A.

The air bag 10 is configured so as to deploy to protect the passenger when a vehicular collision occurs, causing a shock absorption function to take effect thereby. It is to be understood that it would be possible for the air bag 10 to change a size of the deployment thereof by way of the control of the air bag ECU 1, in response to the information of the passenger.

The warning light 11 is an indicator light that is for performing a warning display when a fault is detected with respect to a control assembly of the air bag 10.

A passenger status indicator light 12 is an indicator light that displays an information of a passenger, such as no passenger being present within the vehicle, an adult passenger being seated within the vehicle, or a child safety seat being in place within the vehicle, as an instance thereof, in accordance with the information of the passenger that is obtained from the vehicular passenger detection system A.

The a load sensors 3a to 3d are a so-called distortion gauge, as an instance thereof, and as such, are intended to detect a distortion that arises from a load that acts upon the seat 2, by converting the distortion arising therefrom into an electrical resistance and detecting the electrical resistance thus converted.

The load sensors 3a to 3d are respectively attached to a different location of the seat 2, and respectively detect a load at each of four different locations of the seat 2 thereof.

Figure 2:
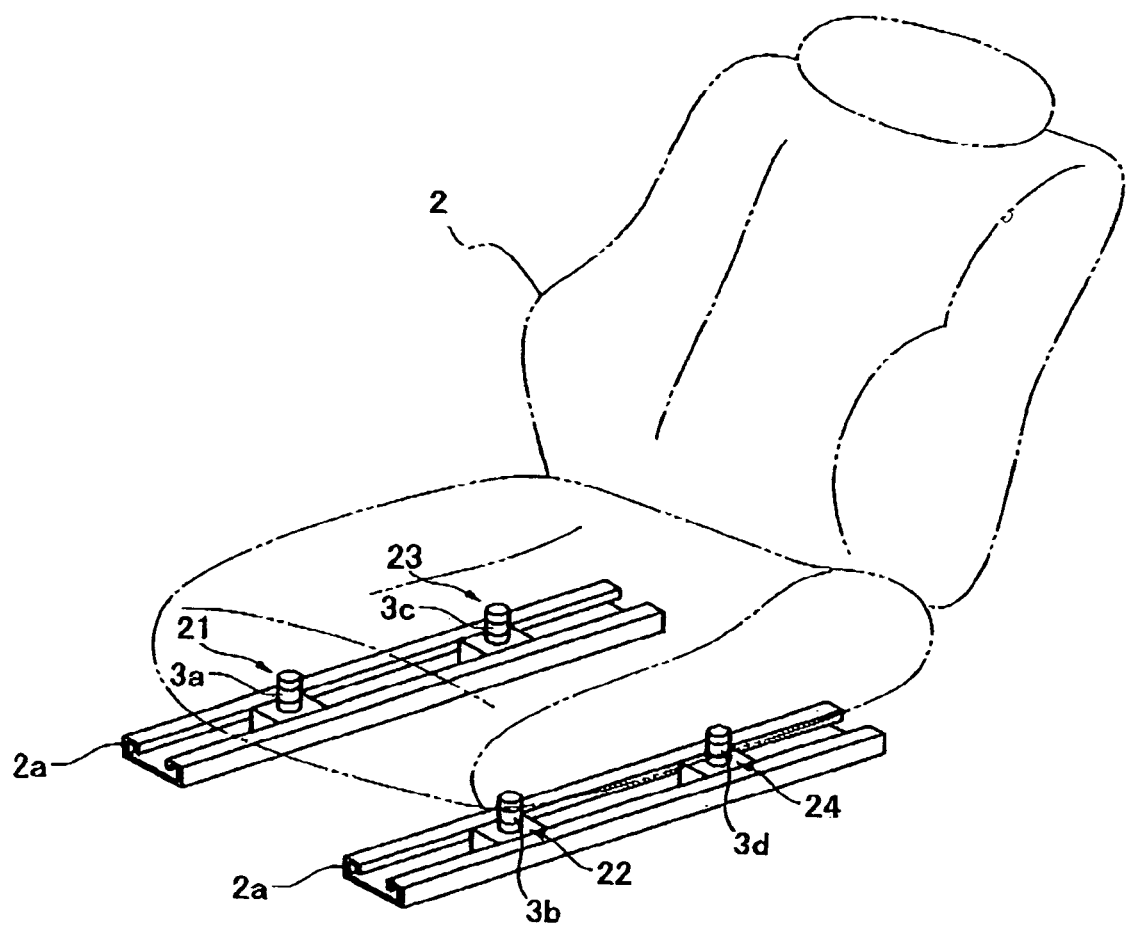
FIG. 2 is a diagram that depicts a configuration of an attachment of a load sensor with respect to the vehicular passenger detection system according to the embodiment.

According to the embodiment, the load sensors 3a to 3d, as an instance thereof, are installed upon a right front foot unit 21, a left front foot unit 22, a right rear foot unit 23, and a left rear foot unit 24, respectively, of a passenger side seat 2, which, in turn, is mounted upon a seat rail 2a and 2a, so as to be capable of being moved thereupon, such as is shown in FIG. 2. A load that acts upon each respective foot unit 21 to 24 thereof is thus detected individually thereby.

The vehicular passenger detection system A comprises the passenger detection ECU 4, and the passenger detection ECU 4 thereof further comprises a passenger seating determination unit, i.e., a passenger seating detection device, 5, a passenger determination unit 6, a fault diagnosis unit, i.e., a fault diagnosis device, 7, and a memory unit that records a fault, i.e., a fault recording device, 8. The fault recording device 8 further includes a fault determination device that is capable of determining whether or not information of a fault thereupon relates to a fault for which a repair thereupon is required.

The passenger seating determination unit 5 determines whether or not a passenger is present upon the seat 2, in accordance with a detection value from the plurality of load sensors 3a to 3d. According to the embodiment, the passenger seating determination unit 5 is configured so as to compare the detection value thereof with a predetermined threshold value, and if a sum of the detection value thereof is less than the threshold value, to determine that no passenger is present upon the seat 2.

When it is determined by the passenger seating determination unit 5 that the passenger is present upon the seat 2, the passenger determination unit 6 determines a state of the passenger who is present upon the seat 2, in accordance with the detection value from the plurality of load sensors 3a to 3d. Furthermore, according to the embodiment, the passenger determination unit 6 compares the detection value thereof with a predetermined threshold value. If a sum of the detection value thereof is greater than or equal to the threshold value, the passenger determination unit 6 determines that an adult is seated upon the seat 2. If the sum of the detection value thereof is less than the threshold value, the passenger determination unit 6 determines that a child safety seat is seated upon the seat 2 instead.

The fault diagnosis unit 7 is configured to perform a finding and a diagnosis of a fault that relates to the plurality of load sensors 3a to 3d and the passenger detection ECU 4. The fault diagnosis unit 7 is configured to conduct an internal inspection, at a preset prescribed interval, as to whether or not a fault has occurred. If a fault is found thereby, the fault diagnosis unit 7 diagnoses characteristics such as a location and a description of the fault thus found, and outputs an instruction signal that causes a fault recording unit 9a (to be described hereinafter) of a memory unit 8 to record an information of a fault thereof thereupon.

The passenger detection ECU 4 additionally comprises the memory unit 8, and the memory unit 8 is a recording medium, such as an EEPROM, as an instance thereof, which further comprises a fault recording unit 9a and a baseline value compensation recording unit, i.e., a baseline value compensation recording device, 9b.

The fault recording unit 9a comprises a fault recording unit table, such as is depicted in FIG. 4, as an instance thereof, and records the information of the fault thereof, such as the location and the description of the fault, in accordance with the instruction signal that is inputted thereto from the fault diagnosis unit 7.

The baseline value compensation recording unit 9b includes a baseline value compensation recording unit table, such as is shown in FIG. 4, as an instance thereof. When a baseline value compensation at a time of maintenance or repair of the load sensors 3a to 3d is performed, the baseline value compensation recording unit 9b records the information of the fault thereof as an information of a compensation that relates to an earlier repair that is performed immediately prior to repair of the current fault.

It is to be understood that the baseline value compensation at the time of maintenance or repair refers to employing, for example, a prescribed tool or a prescribed input code, subsequent to performing, for example, a maintenance of a vehicle, or a repair of a fault thereupon, to compensate the detection value from the plurality of load sensors 3a to 3d to either a prescribed baseline value or to zero, when no passenger is seated upon the seat 2.

Put another way, the baseline value compensation at the time of maintenance or repair differs from a baseline value compensation that is for compensating for a misalignment of a baseline value that may result from deterioration over time of the plurality of load sensors 3a to 3d, and which is normally performed when a vehicle's ignition is switched on.

Figure 3:
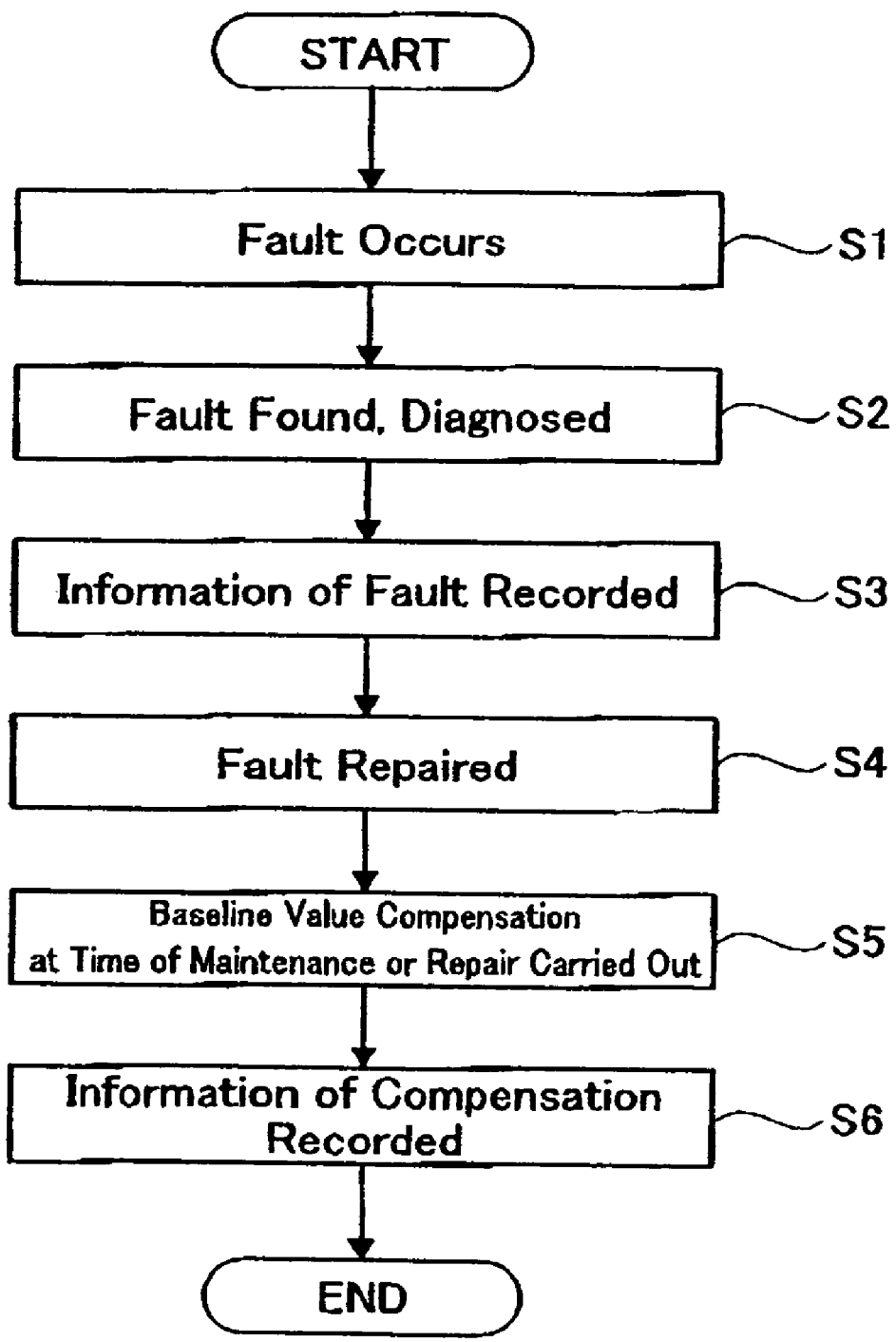
FIG. 3 is a flowchart that depicts a fault recording process with respect to the vehicular passenger detection system according to the embodiment.

The following is a description of a fault recording process of the vehicular passenger detection system A according to the present invention, with reference to the flowchart that is illustrated in FIG. 3.

The process begins with step S1, wherein a fault occurs with either the plurality of load sensors 3a to 3d or the passenger detection ECU 4. In the present circumstance, it is presumed that the fault has occurred with the passenger detection ECU 4.

In such a circumstance, the fault has been neither found nor diagnosed, and thus, nothing has yet been recorded within any table of the fault recording unit 9a or the baseline value compensation recording unit 9b, such as is depicted in FIG. 4A.

In step S2, a finding and a diagnosis of the fault is performed by the fault diagnosis unit 7. Upon finding the fault, the fault diagnosis unit 7 outputs an instruction signal to the fault recording unit 9a that causes the fault recording unit 9a to record an information of a fault that denotes a location of the fault thus found.

Upon receipt of the instruction signal thereof, in step S3, the fault recording unit 9a records the information of the fault thereof upon a fault recoding unit table. In the present circumstance, "ECU Fault" is written to an area of a fault code number 1, such as is depicted in FIG. 4B.

It is to be understood that a baseline value compensation at a time of maintenance or repair has not been performed upon the plurality of load sensors 3a to 3d in the present circumstance, and thus, nothing is recorded upon a table of the baseline value compensation recording unit 9b.

Thereafter, in step S4, a repair of the fault is performed. The repair thereof is performed at, for example, a vehicle dealership.

After all of the repairs on the fault has been completed, in step S5, the baseline value compensation at the time of maintenance or repair of the plurality of load sensors 3a to 3d is performed.

In step S6, by way of the performance of the baseline value compensation at the time of maintenance or repair thereupon, the baseline value compensation recording unit 9b treats the information of the fault thereof that relates to the repair that is performed immediately prior to the performance of the baseline value compensation at the time of the maintenance or repair thereof as an information of a compensation, records the information of the compensation thereof upon the baseline value compensation recording unit table thereof, and the process terminates. In other words, the baseline value compensation recording unit 9b records fault repair information.

In the present circumstance, a fault code number of "1" is written upon the baseline value compensation recording unit table from among the information of the fault that relates to the repair that is performed immediately prior to the performance of the baseline value compensation at the time of the maintenance or repair thereof, such as is depicted in FIG. 4C.

Thus, when the fault occurs, the information of the fault is recorded, and when the baseline value compensation at the time of the maintenance or repair is performed subsequent to the repair of the fault, the information of the fault that was repaired immediately prior to the baseline value compensation at the time of the maintenance or repair being performed is recorded as the information of the compensation thereof.

Thus, it is possible to determine that, from among the information of the fault that is recorded by the fault recording unit 9a, the information of the fault that is recorded prior to the information of the fault that is recorded as the information of the compensation thereof relates to the earlier fault that has already been repaired, and the information of the fault that is recorded subsequent to the information of the earlier fault that is recorded as the information of the compensation thereof relates to the current fault for which the repair is required.

In summary, as an instance thereof, if, subsequent to the repair of the ECU fault that is recorded in the area of the fault code number 1, a fault should occur once more with the load sensors 3a to 3d and the passenger detection ECU 4, then a "sensor fault" is recorded in an area of a fault code number 2, and an "ECU fault" is recorded in an area of a fault code number 3, such as is depicted in FIG. 4D.

If, however, the fault thus newly arisen is not repaired, and the baseline value compensation at the time of the maintenance or repair thereof is not performed, then the baseline value compensation recording unit table is not updated by the baseline value compensation recording unit 9b. Put another way, the fault code number that is written to the baseline value compensation recording unit table remains at 1.

As a consequence thereof, it is possible to determine that the fault that relates to the fault code number 1 has already been repaired, and that the repair is necessary for the fault that relates to the fault code number 2 and 3.

It is to be understood that if the fault that relates to the fault code number 2 and 3 has been repaired, and the baseline value compensation at the time of the maintenance or repair thereof has been performed, then the baseline value compensation recording unit 9b overwrites the information of the compensation thereof that is recorded upon the baseline value compensation recording unit table with the fault code number 3 of the information of the fault that relates to the repair that has been performed immediately prior to the baseline value compensation at the time of the maintenance or repair thereof being performed.

Thus, the memory unit 8, which is the fault recording device, comprises the baseline value compensation recording unit 9b, which records the information of the compensation that relates to the baseline value compensation at the time of the maintenance or repair of the plurality of load sensors 3a to 3d that is performed subsequent to the repair of the fault thereof.

As a consequence thereof, the information of the compensation of the baseline value compensation at the time of the maintenance or repair that is performed subsequent to the repair of the fault thereof is recorded by the baseline value compensation recording unit 9b. It is possible to determine that the information of the fault that is recorded prior to the recording of the information of the compensation thereof relates to the fault that has already been repaired, and to determine that the information of the fault that is recorded subsequent to the recording of the information of the compensation thereof relates to the fault for which the repair has not been performed.

It is possible to determine whether or not the information of the fault that is recorded upon the fault recording unit 9a relates to the fault whereupon the repair is required.

In addition, it is possible to ascertain the description of the necessary repair, and to smoothly perform the repair of the fault thereof, simply by reading out the information of the fault that is recorded by the fault recording unit 9a.

Furthermore, as an instance thereof, a circumstance is considered wherein, if a fault arises with the passenger detection ECU 4 while the vehicle is in a normal driving operation, then a malfunction would have occurred during a work at the vehicle dealership, such as an improper connection of a harness, when the fault that has arisen with the passenger detection ECU 4 is repaired at the vehicle dealership.

In such a circumstance, while the fault of the passenger detection ECU 4 that arises while the vehicle is in the normal driving operation thereof is recorded upon, for example, a log that would be maintained at the vehicle dealership, the malfunction that occurred during the work thereupon at the vehicle dealership would not be recorded upon the log thereof. It would not be possible, however, to perform the baseline value compensation at the time of the maintenance or repair only when the fault that arises while the vehicle is in the normal driving operation thereof, and the occurrence of the malfunction with the harness would be recorded upon the fault recording unit 9a.

In the present circumstance, the baseline value compensation at the time of the maintenance or repair is performed once more after the harness is correctly connected, whereupon the baseline value compensation recording unit 9b records the information of the fault of the harness malfunction, which is the information of the fault that relates to the repair that is performed immediately prior to the baseline value compensation at the time of the maintenance or repair thereof, as the information of the compensation thereof.

It is thus possible to find that a malfunction that has occurred during the work at the vehicle dealership, which was not recorded in the vehicle dealership's log, has been repaired subsequent to the repair of the fault that arose while the vehicle is in the normal driving operation thereof.

According to the present invention, the information of the compensation of the baseline value compensation at the time of the maintenance or repair that is performed subsequent to the repair of the fault is recorded upon the baseline value compensation recording unit. As a consequence thereof, it is possible to determine that the information of the fault that is recorded prior to the information of the compensation thereof relates to the fault that has already been repaired, and that the information of the fault that is recorded subsequent to the information of the compensation thereof relates to the fault whereupon the repair has not been performed.

As a consequence thereof, it is possible to determine whether or not the information of the fault that is recorded upon the fault recording unit relates to a fault whereupon a repair is required.

In addition, it is possible to ascertain the description of the necessary repair, and to smoothly perform the repair of the fault thereof, simply by reading out the information of the fault thereupon.

While a preferred embodiment according to the present invention has been described herein, it is to be understood that the present invention is not restricted to the embodiment thus described. A wide range of types of variations and alterations to the embodiment thus described would be allowable herein.

As an instance thereof, according to the embodiment, a fault code number is recorded with information of a fault that relates to a repair that is performed immediately prior to the baseline value compensation at the time of the maintenance or repair being performed, as information of compensation. It will be satisfactory, however, if a determination is possible thereupon as to which of the information of the fault thus recorded related to the fault that has already been repaired.

As a consequence thereof, the information that is recorded as the information of the compensation thereof is not restricted to the fault code number, and it would be permissible for the information thus recorded to be such as a description of the fault, a time whereat the fault occurred, or a replaced component thereupon.

In such a circumstance, according to the embodiment, it is possible to determine whether or not the information of the fault that is recorded upon the fault recording unit 9a of the memory unit 8 is the fault information that relates to a fault whereupon a repair is required.

What is claimed is:

1. A vehicular passenger detection system, comprising:
   a load detection device configured to detect a load that acts upon a seat that is installed in a vehicle;
   a passenger seating detection device configured to determine whether or not an occupant is seated upon the seat, in accordance with a result of a detection of the load detection device; and
   a fault recording device configured to record information of a current fault that has occurred upon either the load detection device or the passenger seating detection device;
   wherein the fault recording device includes a fault determination device configured to determine whether or not the information of the current fault is information of a fault requiring a repair, the fault determination device including:
      a fault recording unit configured to record a current fault; and
      a baseline value compensation recording unit configured to record and store fault compensation information relating to an earlier repair performed immediately prior to a time when repair of the current fault is performed, and configured to subsequently record and store fault repair information relating to the current fault requiring repair.

2. The vehicular passenger detection system according to claim 1, wherein:
   the fault recording unit includes a fault recording unit table configured to record characteristic information of a fault, including at least one of a location and a description of the fault.

3. The vehicular passenger detection system according to claim 1, wherein:
   the baseline value compensation recording unit includes a baseline value compensation recording unit table configured to record fault repair information, the fault repair information relating to a repair that is performed immediately prior to performing an adjustment of a baseline value compensation of the load detection device when a maintenance or repair is performed.

* * * * *